US012649476B2

(12) United States Patent
Djuric et al.

(10) Patent No.: US 12,649,476 B2
(45) Date of Patent: Jun. 9, 2026

(54) TRACKING OF ARTICULATED VEHICLES

(71) Applicant: Aurora Operations, Inc., Mountain View, CA (US)

(72) Inventors: Nemanja Djuric, Pittsburgh, PA (US); Cuichun Xu, Sewickley, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 244 days.

(21) Appl. No.: 18/320,340

(22) Filed: May 19, 2023

(65) Prior Publication Data

US 2024/0383485 A1 Nov. 21, 2024

(51) Int. Cl.
B60W 40/10 (2012.01)
B60W 60/00 (2020.01)
(52) U.S. Cl.
CPC .......... B60W 40/10 (2013.01); B60W 60/001 (2020.02); *B60W 2300/14* (2013.01)
(58) Field of Classification Search
CPC ............... B60W 40/10; B60W 60/001; B60W 2300/14; B60W 2050/0031
See application file for complete search history.

(56) References Cited

U.S. PATENT DOCUMENTS 4,070,033 A * 1/1978 Weir .................. B62D 53/0864
280/476.1
4,741,549 A * 5/1988 Gevers ................. B62D 53/061
280/407.1

(Continued)

FOREIGN PATENT DOCUMENTS

CN 108010053 A * 5/2018 ............... B60D 1/24
CN 113847920 A * 12/2021 ........ B60W 60/0011
(Continued)

OTHER PUBLICATIONS

"Improved Tracking of Articulated Vehicles in Self-Driving Applications Using Phantom Observations;" Xu et al., 2023 IEEE 26th International Conference on Intelligent Transportation Systems (ITSC) (2023, pp. 3699-3705); Sep. 24, 2023. (Year: 2023).*

(Continued)

*Primary Examiner* — Khoi H Tran
*Assistant Examiner* — Jorge O Peche
(74) *Attorney, Agent, or Firm* — Dority & Manning, P.A.

(57) ABSTRACT

Systems and methods for improved tracking of articulated vehicles can obtain, through one or more sensor systems onboard a vehicle, sensor data descriptive of an environment of the vehicle, the environment including an articulated vehicle having at least a first portion and a second portion; generate based on the sensor data, first state data for the first portion of the articulated vehicle and second state data for the second portion of the articulated vehicle; determine an articulated vehicle relationship between the first portion and the second portion based on the first state data for the first portion and the second state data for the second portion; generate, using an articulated vehicle motion model, synthetic motion data for the second portion based on the first state data for the first portion; and update the second state data of the second portion based on the synthetic motion data.

20 Claims, 10 Drawing Sheets

(56) References Cited

U.S. PATENT DOCUMENTS

| | | | | |
|---|---|---|---|---|
| 4,762,192 | A * | 8/1988 | Maxwell | B62D 59/04 |
| | | | | 180/14.2 |
| 4,768,802 | A * | 9/1988 | Winkler | B62D 53/0864 |
| | | | | 280/81.6 |
| 4,848,499 | A * | 7/1989 | Martinet | B62D 13/06 |
| | | | | 180/443 |
| 6,604,035 | B1 * | 8/2003 | Wetzel | B60T 8/1708 |
| | | | | 701/72 |
| 6,694,233 | B1 * | 2/2004 | Duff | G05D 1/0246 |
| | | | | 73/178 R |
| 7,765,066 | B2 * | 7/2010 | Braeuchle | B60W 30/095 |
| | | | | 701/41 |
| 9,238,483 | B2 * | 1/2016 | Hafner | B60W 50/14 |
| 9,373,044 | B2 * | 6/2016 | Wallat | B62D 15/025 |
| 9,487,212 | B1 * | 11/2016 | Adam | B60W 30/143 |
| 9,493,187 | B2 * | 11/2016 | Pilutti | B60D 1/62 |
| 9,723,274 | B2 * | 8/2017 | Lavoie | B60W 50/0097 |
| 9,854,209 | B2 * | 12/2017 | Aich | B60W 10/18 |
| 9,910,151 | B2 * | 3/2018 | Cashler | G01S 7/40 |
| 10,351,146 | B2 * | 7/2019 | Prasad | B60W 40/12 |
| 11,113,873 | B1 * | 9/2021 | Bosse | G06T 19/20 |
| 11,348,340 | B1 * | 5/2022 | Sheng | G06V 20/58 |
| 11,663,726 | B2 * | 5/2023 | Das | G06T 7/20 |
| | | | | 701/28 |
| 11,807,107 | B2 * | 11/2023 | Rust | B60W 10/18 |
| 11,851,082 | B2 * | 12/2023 | Fairfield | B60W 60/001 |
| 11,878,682 | B2 * | 1/2024 | Lee | B60W 30/18163 |
| 11,938,998 | B2 * | 3/2024 | Rust | B62D 13/06 |
| 2002/0069006 | A1 * | 6/2002 | Faye | B60T 8/1708 |
| | | | | 280/400 |
| 2002/0128764 | A1 * | 9/2002 | Hecker | B60T 8/1708 |
| | | | | 701/70 |
| 2004/0181338 | A1 * | 9/2004 | Dobler | G08G 1/165 |
| | | | | 701/1 |
| 2008/0136139 | A1 * | 6/2008 | Russell | B60D 1/30 |
| | | | | 280/489 |
| 2013/0151058 | A1 * | 6/2013 | Zagorski | G05D 1/0289 |
| | | | | 701/1 |
| 2014/0309888 | A1 * | 10/2014 | Smit | B60W 30/045 |
| | | | | 701/41 |
| 2014/0343793 | A1 * | 11/2014 | Lavoie | B60W 10/18 |
| | | | | 701/41 |
| 2016/0159348 | A1 * | 6/2016 | Lavoie | B60W 30/10 |
| | | | | 701/41 |
| 2016/0288786 | A1 * | 10/2016 | Lavoie | B60T 7/20 |
| 2017/0242443 | A1 * | 8/2017 | Schuh | G08G 1/163 |
| 2018/0208187 | A1 * | 7/2018 | Lewis | B62D 33/027 |
| 2018/0339685 | A1 * | 11/2018 | Hill | B60T 13/662 |
| 2018/0364738 | A1 * | 12/2018 | Bridges | G05D 1/0217 |
| 2019/0039649 | A1 * | 2/2019 | Gieseke | B60W 10/20 |
| 2019/0129429 | A1 * | 5/2019 | Juelsgaard | G01S 17/00 |
| 2019/0130759 | A1 * | 5/2019 | Lesher | B60W 40/10 |
| 2019/0367037 | A1 * | 12/2019 | Krishnamurthy | G06N 20/20 |
| 2020/0031276 | A1 * | 1/2020 | Noh | B60W 40/12 |
| 2020/0039483 | A1 * | 2/2020 | Nemeth | B60W 30/08 |
| 2020/0142405 | A1 * | 5/2020 | Havens | G05D 1/0088 |
| 2020/0324763 | A1 * | 10/2020 | Switkes | G08G 1/161 |
| 2020/0377128 | A1 * | 12/2020 | Marczuk | G08G 1/096816 |
| 2021/0149044 | A1 * | 5/2021 | Sim | B62D 15/0285 |
| 2021/0181737 | A1 * | 6/2021 | Patnaik | B60C 23/06 |
| 2021/0237761 | A1 * | 8/2021 | Das | G01S 13/867 |
| 2021/0291667 | A1 * | 9/2021 | Buck | B60W 30/18127 |
| 2021/0380099 | A1 * | 12/2021 | Lee | G08G 1/0141 |
| 2021/0405185 | A1 * | 12/2021 | Price | G01S 13/931 |
| 2022/0009462 | A1 * | 1/2022 | Wolf | B60T 8/1705 |
| 2022/0080985 | A1 * | 3/2022 | Brown | B60W 50/02 |
| 2022/0144259 | A1 * | 5/2022 | Hiemer | B60W 30/09 |
| 2022/0299626 | A1 * | 9/2022 | Chen | B60W 60/0015 |
| 2022/0314738 | A1 * | 10/2022 | Beaufrere | B60H 1/00428 |
| 2023/0051632 | A1 * | 2/2023 | Bellare | B60W 30/16 |
| 2023/0095698 | A1 * | 3/2023 | Schubert | G01S 13/46 |
| | | | | 342/70 |
| 2023/0121191 | A1 * | 4/2023 | Rust | B60L 7/18 |
| | | | | 701/22 |
| 2023/0249711 | A1 * | 8/2023 | Hardy | G06F 30/20 |
| | | | | 701/24 |
| 2023/0331298 | A1 * | 10/2023 | Alghooneh | B60W 50/14 |
| 2023/0368663 | A1 * | 11/2023 | Puchalski | B60Q 1/535 |
| 2024/0025269 | A1 * | 1/2024 | Rust | B60W 30/18127 |
| 2024/0034405 | A1 * | 2/2024 | Rust | B62D 6/003 |
| 2024/0062656 | A1 * | 2/2024 | Forscher | G08G 1/163 |
| 2024/0092422 | A1 * | 3/2024 | Rust | B62D 13/06 |
| 2024/0124028 | A1 * | 4/2024 | Djuric | B60W 60/0027 |
| 2024/0149910 | A1 * | 5/2024 | Stout | B60D 1/06 |
| 2024/0149914 | A1 * | 5/2024 | Stout | B60D 1/62 |
| 2024/0317003 | A1 * | 9/2024 | Bechtel | B60D 1/30 |
| 2024/0383485 | A1 * | 11/2024 | Djuric | B60W 40/10 |
| 2025/0058593 | A1 * | 2/2025 | Rivero | G01M 1/122 |
| 2025/0058594 | A1 * | 2/2025 | Fox-Rabinovitz | B60D 1/248 |
| 2025/0058779 | A1 * | 2/2025 | Fox-Rabinovitz | |
| | | | | B60W 30/18009 |

FOREIGN PATENT DOCUMENTS

| | | | | | |
|---|---|---|---|---|---|
| CN | 115087588 | A | * | 9/2022 | B62D 59/04 |
| CN | 115113191 | A | * | 9/2022 | B60W 30/09 |
| CN | 115675524 | A | * | 2/2023 | |
| CN | 115042779 | B | * | 10/2025 | G06V 20/588 |
| DE | 102014000978 | A1 | * | 7/2015 | B60W 30/06 |
| DE | 102016209896 | A1 | * | 12/2016 | B62D 13/06 |
| DE | 102016214110 | A1 | * | 2/2018 | B60W 40/12 |
| DE | 102020126750 | A1 | * | 5/2021 | B62D 15/025 |
| DE | 102021212062 | A1 | * | 6/2022 | B60T 8/1708 |
| EP | 4644139 | A1 | * | 11/2025 | B60D 1/62 |
| JP | 2000198430 | A | * | 7/2000 | B60T 8/1755 |
| KR | 20240028415 | A | * | 3/2024 | G05D 1/6985 |
| WO | WO-2019006021 | A1 | * | 1/2019 | G01S 13/865 |
| WO | WO-2019231470 | A1 | * | 12/2019 | B60D 1/36 |
| WO | WO-2022016044 | A1 | * | 1/2022 | B60Q 1/08 |
| WO | WO-2023172239 | A1 | * | 9/2023 | B60T 8/1708 |

OTHER PUBLICATIONS

"System, Design and Experimental Validation of Autonomous Vehicle in an Unconstrained Environment;" Azam et al., Sensors (Basel, Switzerland), 20(21), 5999; Oct. 22, 2020. (Year: 2020).*

"A USV platform for surface autonomy;" Sinisterra et al., OCEANS 2017—Anchorage (2017, pp. 1-8); Jan. 26, 2018 (Year: 2018).*

Bellone et al., "Extension of trajectory planning in parameterized spaces to articulated vehicles", 22nd IEEE International Conference on Emerging Technologies and Factory Automation, 2017, pp. 1-6.

Pradalier et al., "Robust trajectory tracking for a reversing tractor trailer", Journal of Field Robotics, 2008, 16 pages.

* cited by examiner

500

TOP VIEW

502

$\phi$  $v$  $W_1$ $\theta_1$  $L_1$ $L_2$ $y_B$

506

504

$H$  $y$ $L_3$ $\theta_2$ $W_2$ $x_B$  $x$

600

602    610    614    612

650

652    660    664    662

700

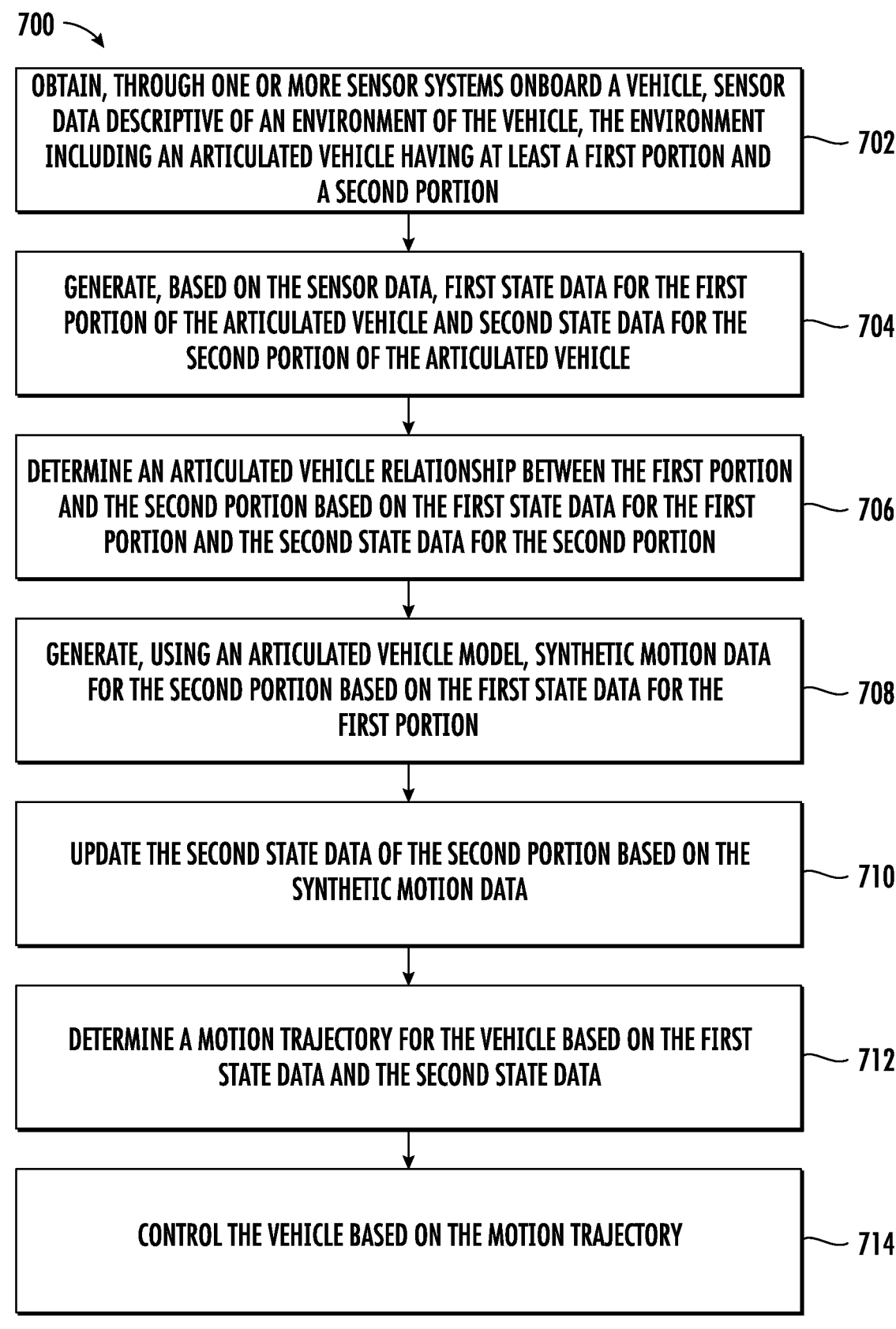

OBTAIN, THROUGH ONE OR MORE SENSOR SYSTEMS ONBOARD A VEHICLE, SENSOR DATA DESCRIPTIVE OF AN ENVIRONMENT OF THE VEHICLE, THE ENVIRONMENT INCLUDING AN ARTICULATED VEHICLE HAVING AT LEAST A FIRST PORTION AND A SECOND PORTION — 702

GENERATE, BASED ON THE SENSOR DATA, FIRST STATE DATA FOR THE FIRST PORTION OF THE ARTICULATED VEHICLE AND SECOND STATE DATA FOR THE SECOND PORTION OF THE ARTICULATED VEHICLE — 704

DETERMINE AN ARTICULATED VEHICLE RELATIONSHIP BETWEEN THE FIRST PORTION AND THE SECOND PORTION BASED ON THE FIRST STATE DATA FOR THE FIRST PORTION AND THE SECOND STATE DATA FOR THE SECOND PORTION — 706

GENERATE, USING AN ARTICULATED VEHICLE MODEL, SYNTHETIC MOTION DATA FOR THE SECOND PORTION BASED ON THE FIRST STATE DATA FOR THE FIRST PORTION — 708

UPDATE THE SECOND STATE DATA OF THE SECOND PORTION BASED ON THE SYNTHETIC MOTION DATA — 710

DETERMINE A MOTION TRAJECTORY FOR THE VEHICLE BASED ON THE FIRST STATE DATA AND THE SECOND STATE DATA — 712

CONTROL THE VEHICLE BASED ON THE MOTION TRAJECTORY — 714

FIG. 7

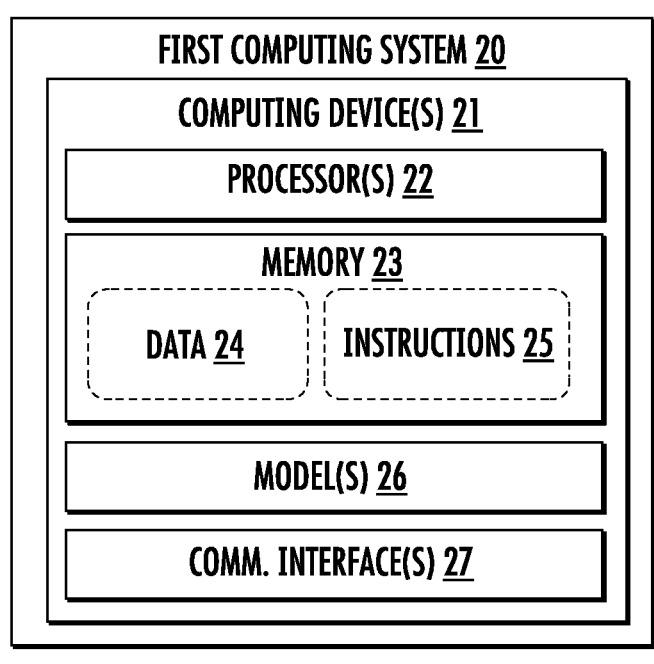
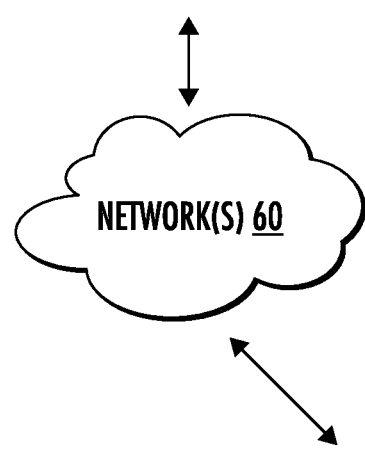
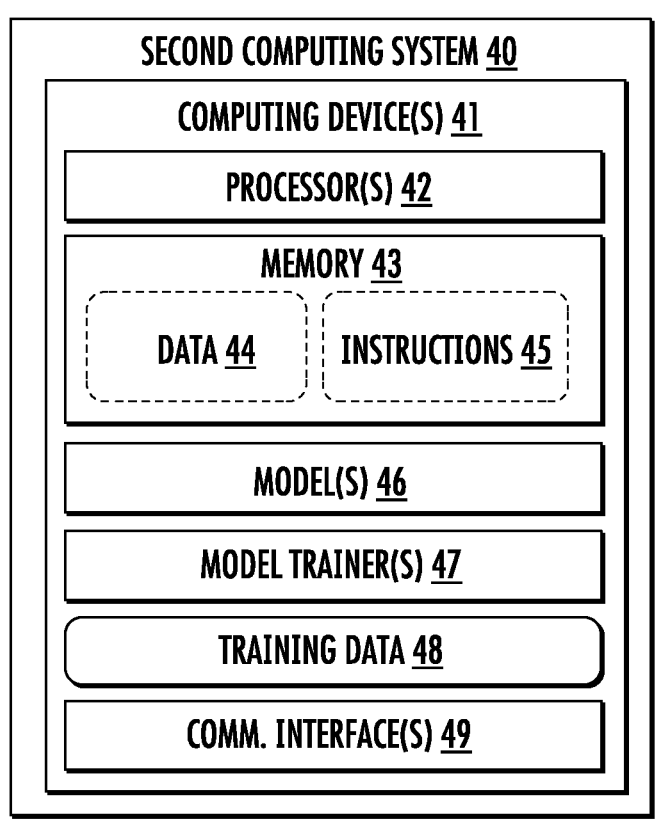
FIG. 8

TRACKING OF ARTICULATED VEHICLES

BACKGROUND

An autonomous platform can process data to perceive an environment through which the autonomous platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

The technology of the present disclosure improves tracking of articulated vehicles, such as single- or double-trailer semitrucks, articulated buses, and so on. In many conventional tracking systems, different portions of articulated vehicles are treated as independent tracks, which could lead to inconsistencies. For instance, a semitruck cab and its trailer can have slightly different yaw rates, velocities, accelerations, etc. that could lead to inconsistencies in planning for future states. The techniques of this disclosure instead jointly reason about predecessor and successor tracks so that the tracks have more consistent states, leading to improved object tracking by autonomous vehicles.

To do so, an autonomous vehicle can include an onboard perception system with a tracker configured to track articulated vehicles according to the present disclosure. First, each part (e.g., tractor, first trailer, second trailer, etc.) of the articulated vehicle can be tracked independently (e.g., as independent tracks). Next, the tracker analyzes the output to determine whether an articulated vehicle relationship (e.g., a predecessor-successor relationship) exists between tracks that represent different parts of an articulated vehicle. The tracker can also determine variables such as hitch displacement or trailer angle at this operation. Finally, the tracker generates synthetic motion data from one portion of the articulated vehicle using an articulated vehicle motion model and updates the state of the other part(s) based on the synthetic measurement. The updated state can be more consistent with the overall articulated vehicle because the synthetic motion data used to produce the updated state is created from another portion of the articulated vehicle.

This approach has only minimal computational increases compared to tracking each portion independently and has significantly reduced computing resource usage compared to using a single actor state augmented with both predecessor and successor states. In some implementations, this approach can only be applied for some motion parameters (e.g., velocity, acceleration) of the portion whose state is being updated. Furthermore, in some implementations, this approach can only be applied if there is some occlusion, poor visibility, bias, or some other condition leading to low confidence in one portion of an articulated vehicle.

Example aspects of the present disclosure provide for a number of technical effects and benefits. For example, generating synthetic motion data for a second portion of an articulated vehicle using an articulated vehicle motion model and updating second state data based on that synthetic motion data provides for improved consistency and accuracy of observations across multiple portions of articulated vehicles. As one example, compared to modeling each portion independently, the use of an articulated vehicle motion model to generate synthetic motion data provides for generating state data for each portion that accurately models real-world constraints imposed by articulated vehicles without requiring the system to have preexisting knowledge that a detected actor or object is a portion of an articulated vehicle. For instance, systems and methods described herein can determine an articulated vehicle relationship in real time based on the predicted motion of portions of the articulated vehicle.

In addition, generating, based on the sensor data, first state data for the first portion of the articulated vehicle and second state data for the second portion of the articulated vehicle; determining an articulated vehicle relationship between the first portion and the second portion based on the first state data for the first portion and the second state data for the second portion; generating, using an articulated vehicle motion model, synthetic motion data for the second portion based on the first state data for the first portion; and updating the second state data of the second portion based on the synthetic motion data can provide for reduced computing resource usage over the theoretically correct approach of augmenting state data for an articulated vehicle to include both predecessor and successor state.

For instance, one example approach to modeling articulated vehicles is to include a single vehicle state that includes dimensional state variables for each articulated segment in the articulated vehicle. This approach is computationally burdensome, although theoretically accurate. For instance, for a two-segment articulated vehicle and a six-dimensional state variable for a single segment, the augmented state variable becomes fourteen-dimensional. For a three-segment vehicle, the augmented state variable becomes twenty-two-dimensional. The high dimensionality of these variables significantly increases system latency and computational requirements, which can frustrate the performance of vehicle navigation systems, especially those which must be low latency. Example aspects of the present disclosure, however, provide for accurate and consistent observations across portions of articulated vehicles without increasing dimensionality of state variables.

For example, in an aspect, the present disclosure provides a computer-implemented method for improved tracking of articulated vehicles. The computer-implemented method can include obtaining, through one or more sensor systems onboard a vehicle, sensor data descriptive of an environment of the vehicle, the environment including an articulated vehicle having at least a first portion and a second portion. The computer-implemented method can include generating, based on the sensor data, first state data for the first portion of the articulated vehicle and second state data for the second portion of the articulated vehicle. The computer-implemented method can include determining an articulated vehicle relationship between the first portion and the second portion based on the first state data for the first portion and the second state data for the second portion. The computer-implemented method can include generating, using an articulated vehicle motion model, synthetic motion data for the second portion based on the first state data for the first portion. The computer-implemented method can include updating the second state data of the second portion based on the synthetic motion data.

In some implementations, the articulated vehicle relationship can indicate a predecessor-successor relationship, wherein a predecessor can be one of the first portion or the second portion of the articulated vehicle and a successor can be the other of the first portion or the second portion of the articulated vehicle.

In some implementations, the first portion and the second portion can be connected at a joint of the articulated vehicle.

In some implementations, the articulated vehicle can be a truck including a tractor and a trailer, wherein the first portion can be one of the tractor or the trailer, and wherein the second portion can be the other of the tractor or the trailer.

In some implementations, the first portion can be a first trailer and the second portion can be a second trailer.

In some implementations, the articulated vehicle motion model can include one or more kinematic relationships between one or more parameters of the second portion and one or more parameters of the first portion.

In some implementations, the parameters of the first portion can include at least one of: a position of a wheelbase of the first portion, an orientation of the first portion, or a position of a joint of the articulated vehicle relative to the first portion.

In some implementations, the one or more kinematic relationships can be based on an acceleration and a velocity of a joint of the articulated vehicle.

In some implementations, the computer-implemented method can further include determining a motion trajectory for the vehicle based on the first state data and the second state data. In some implementations, the computer-implemented method can further include controlling the vehicle based on the motion trajectory.

In some implementations, generating, using an articulated vehicle motion model, synthetic motion data for the second portion based on the first state data for the first portion can include determining whether to model the synthetic motion data for the second portion based on at least one of: a confidence associated with the sensor data, or a confidence associated with the first state data or the second state data.

For example, in an aspect, the present disclosure provides for an autonomous vehicle control system. The autonomous vehicle control system can include one or more processors and one or more non-transitory, computer-readable media storing instructions that cause the one or more processors to perform operations. The operations can include obtaining, through one or more sensor systems onboard a vehicle, sensor data descriptive of an environment of the vehicle, the environment including an articulated vehicle having at least a first portion and a second portion. The operations can include generating, based on the sensor data, first state data for the first portion of the articulated vehicle and second state data for the second portion of the articulated vehicle. The operations can include determining an articulated vehicle relationship between the first portion and the second portion based on the first state data for the first portion and the second state data for the second portion. The operations can include generating, using an articulated vehicle motion model, synthetic motion data for the second portion based on the first state data for the first portion. The operations can include updating the second state data of the second portion based on the synthetic motion data.

In some implementations, the articulated vehicle relationship can indicate a predecessor-successor relationship, where a predecessor can be one of the first portion or the second portion of the articulated vehicle and a successor can be the other of the first portion or the second portion of the articulated vehicle.

In some implementations, the first portion and the second portion can be connected at a joint of the articulated vehicle.

In some implementations, the articulated vehicle can be a truck including a tractor and a trailer, wherein the first portion can be one of the tractor or the trailer, and wherein the second portion can be the other of the tractor or the trailer.

In some implementations, the articulated vehicle motion model can include one or more kinematic relationships between one or more parameters of the second portion and one or more parameters of the first portion.

In some implementations, the parameters of the first portion can include at least one of: a position of a wheelbase of the first portion, an orientation of the first portion, or a position of a joint of the articulated vehicle relative to the first portion.

In some implementations, the one or more kinematic relationships can be based on an acceleration and a velocity of a joint of the articulated vehicle.

In some implementations, the operations can further include determining a motion trajectory for the vehicle based on the first state data and the second state data. In some implementations, the operations can further include controlling the vehicle based on the motion trajectory.

In some implementations, generating, using an articulated vehicle motion model, synthetic motion data for the second portion based on the first state data for the first portion can include determining whether to model the synthetic motion data for the second portion based on at least one of: a confidence associated with the sensor data, or a confidence associated with the first state data or the second state data.

For example, in an aspect, the present disclosure provides for an autonomous vehicle. The autonomous vehicle can include one or more processors and one or more non-transitory, computer-readable media storing instructions that cause the one or more processors to perform operations. The operations can include obtaining, through one or more sensor systems onboard a vehicle, sensor data descriptive of an environment of the vehicle, the environment including an articulated vehicle having at least a first portion and a second portion. The operations can include generating, based on the sensor data, first state data for the first portion of the articulated vehicle and second state data for the second portion of the articulated vehicle. The operations can include determining an articulated vehicle relationship between the first portion and the second portion based on the first state data for the first portion and the second state data for the second portion. The operations can include generating, using an articulated vehicle motion model, synthetic motion data for the second portion based on the first state data for the first portion. The operations can include updating the second state data of the second portion based on the synthetic motion data.

Other example aspects of the present disclosure are directed to other systems, methods, vehicles, apparatuses, tangible non-transitory computer-readable media, and devices for perceiving and forecasting the motion of articulated objects.

These and other features, aspects and advantages of various implementations of the present disclosure will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

FIG. 7 is a flowchart of a method according to some implementations of the present disclosure.

FIG. 8 is a block diagram of an example computing system according to some implementations of the present disclosure.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems. As used herein, "about" in conjunction with a stated numerical value is intended to refer to within 20 percent of the stated numerical value, except where otherwise indicated.

Figure 1:
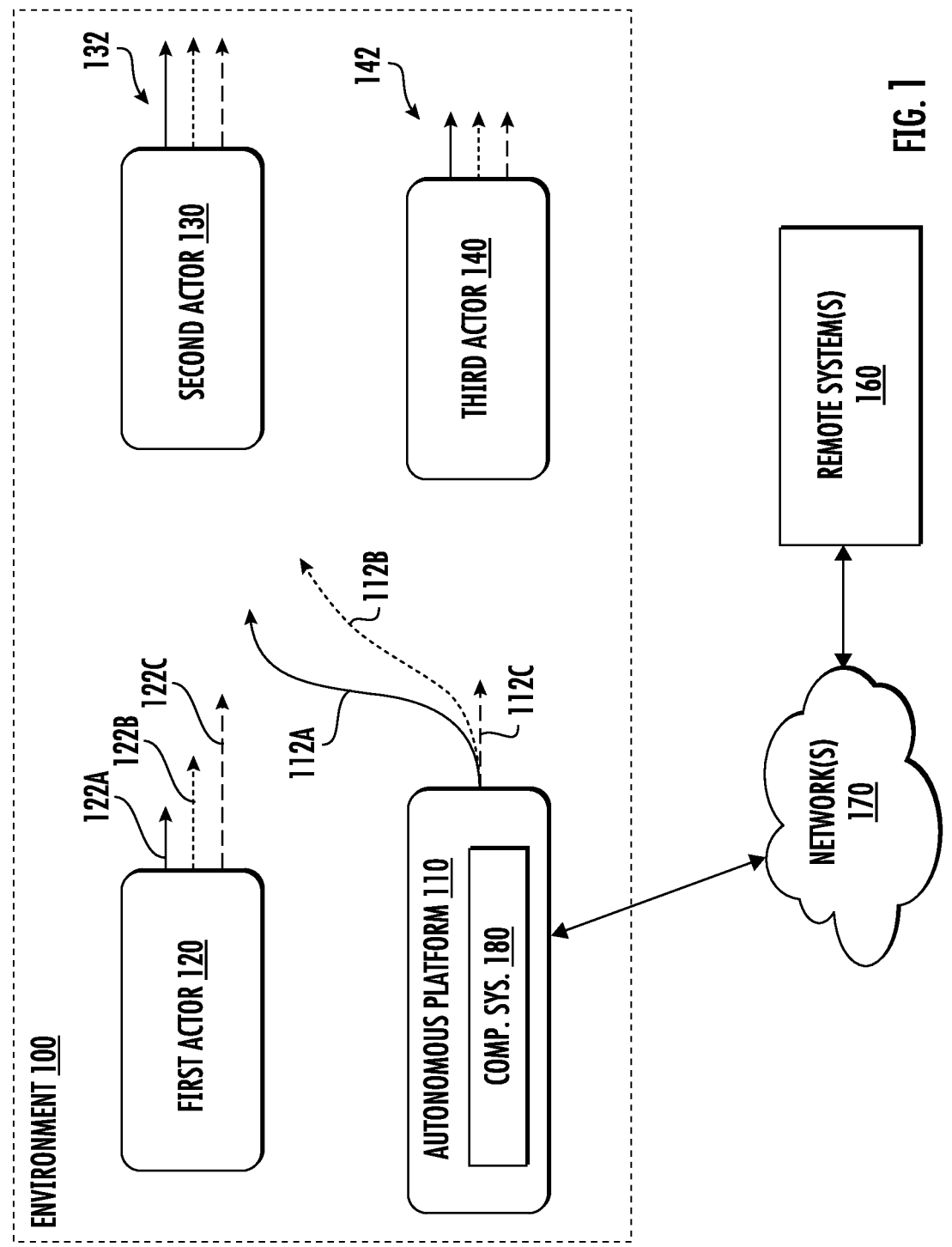
FIG. 1 is a block diagram of an example operating scenario according to some implementations of the present disclosure.

With reference to FIGS. 1-8, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 can be or include an indoor environment (e.g., within one or more facilities, etc.) or an outdoor environment. An indoor environment, for example, can be an environment enclosed by a structure such as a building (e.g., a service depot, maintenance location, manufacturing facility, etc.). An outdoor environment, for example, can be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 can be any type of platform configured to operate within the environment 100. For example, the autonomous platform 110 can be a vehicle configured to autonomously perceive and operate within the environment 100. The vehicles can be a ground-based autonomous vehicles such as, for example, an autonomous car, truck, van, etc. The autonomous platform 110 can be an autonomous vehicle that can control, be connected to, or be otherwise associated with implements, attachments, or accessories for transporting people or cargo. This can include, for example, an autonomous tractor optionally coupled to a cargo trailer. Additionally or alternatively, the autonomous platform 110 can be any other type of vehicle such as one or more aerial vehicles, water-based vehicles, space-based vehicles, other ground-based vehicles, etc.

The autonomous platform 110 can be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) can be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc. In some implementations, one or more of the object(s) (e.g., the first actor 120, the second actor 130, the third actor 140, etc.) can be an articulated vehicle.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
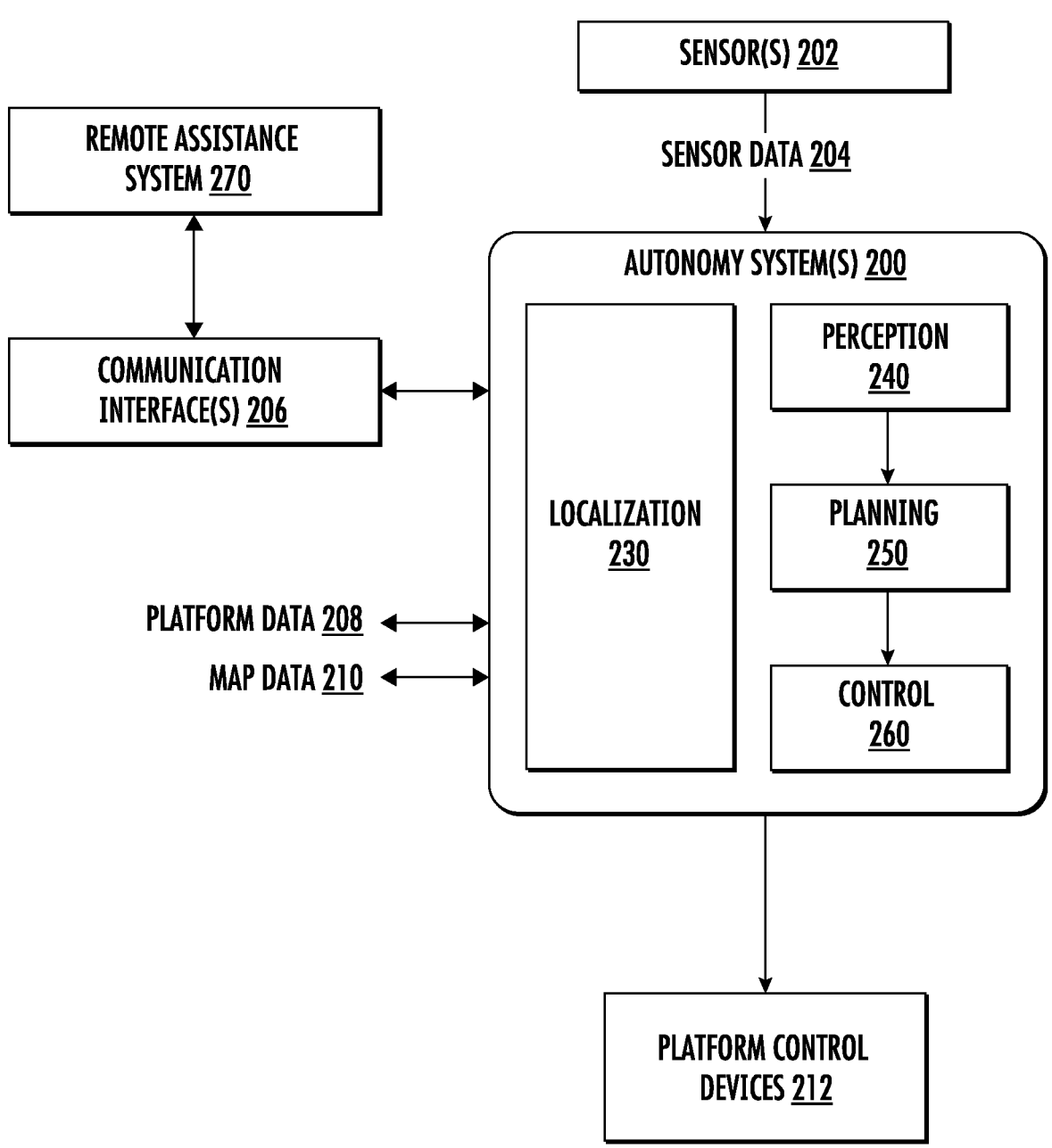
FIG. 2 is a block diagram of example autonomy system(s) for an autonomous platform according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 can include different subsystems for performing various autonomy operations. The subsystems can include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a driver assistance (e.g., advanced driver assistance or ADAS) operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment can be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s)

202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned model. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment. Example aspects of the present disclosure are directed to improving tracking of articulated vehicles, such as by improving determination of the one or more states for articulated vehicles.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy can be a set of discrete decisions (e.g., yield to actor, reverse yield to actor, merge, lane change) that the autonomous platform makes. The strategy can be selected from a plurality of potential strategies. The selected strategy can be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects (e.g., articulated vehicles) to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate. The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment, such as articulated vehicles. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger can be an alert, an error signal, a map feature, a request, a location, a traffic condition, a road condition, etc.

After initiating the session, the autonomy system 200 can provide context data to the remote assistance system 270. The context data can include sensor data 204 and state data of the autonomous platform. For example, the context data can include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 can be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
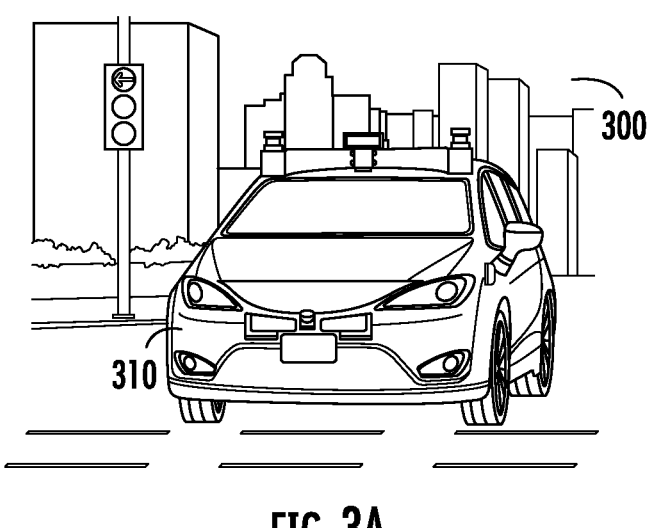
FIGS. 3A-3C are an example operating environment for an autonomous platform according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
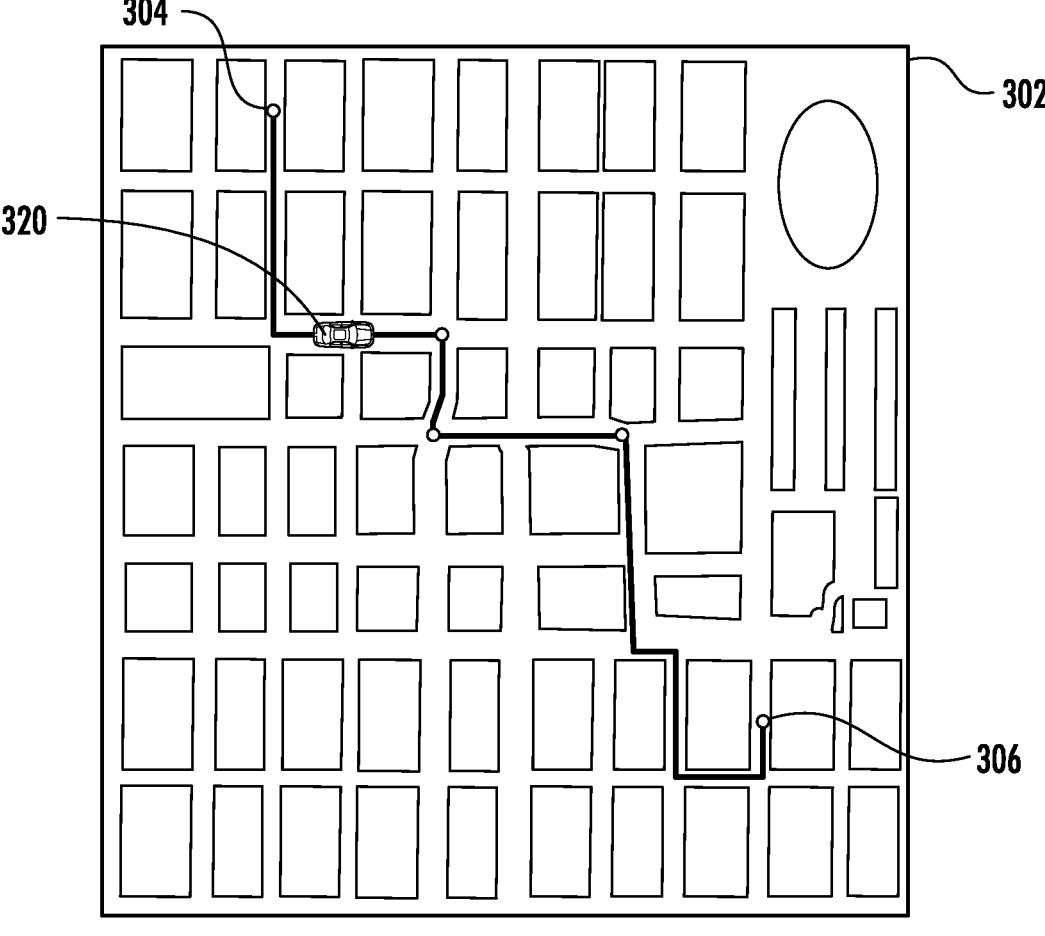

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
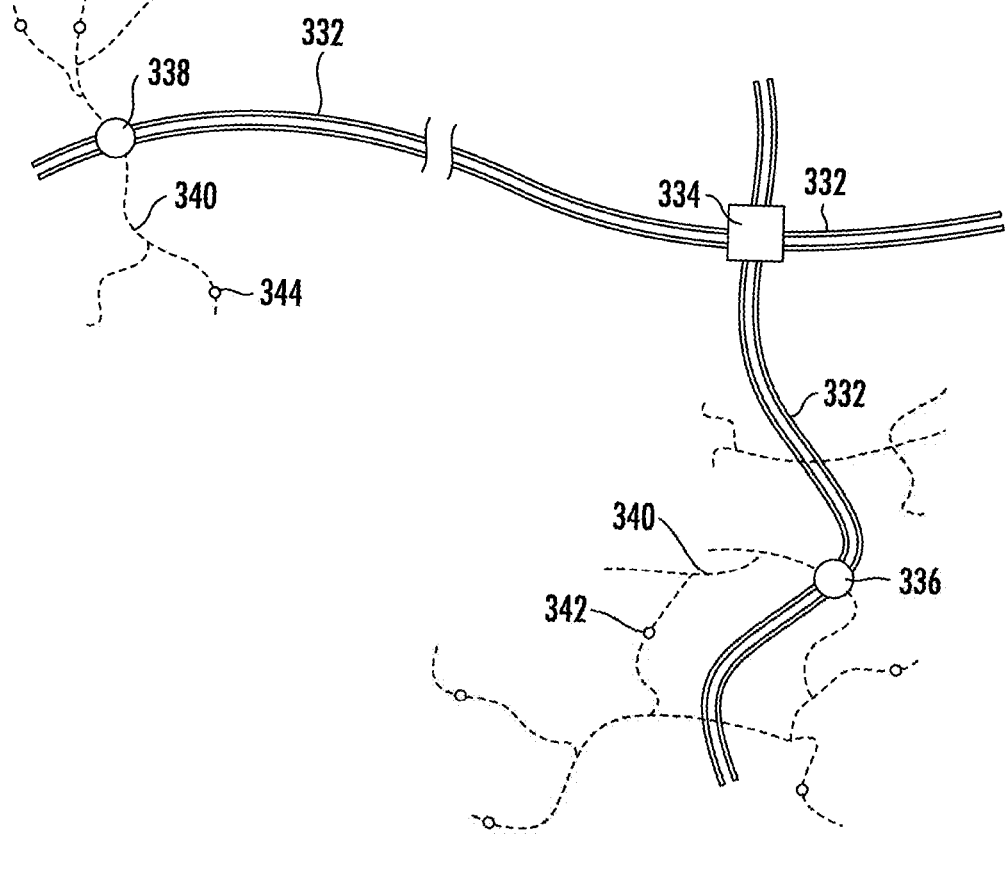

With reference to FIG. 3C, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 310) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

Figure 4:
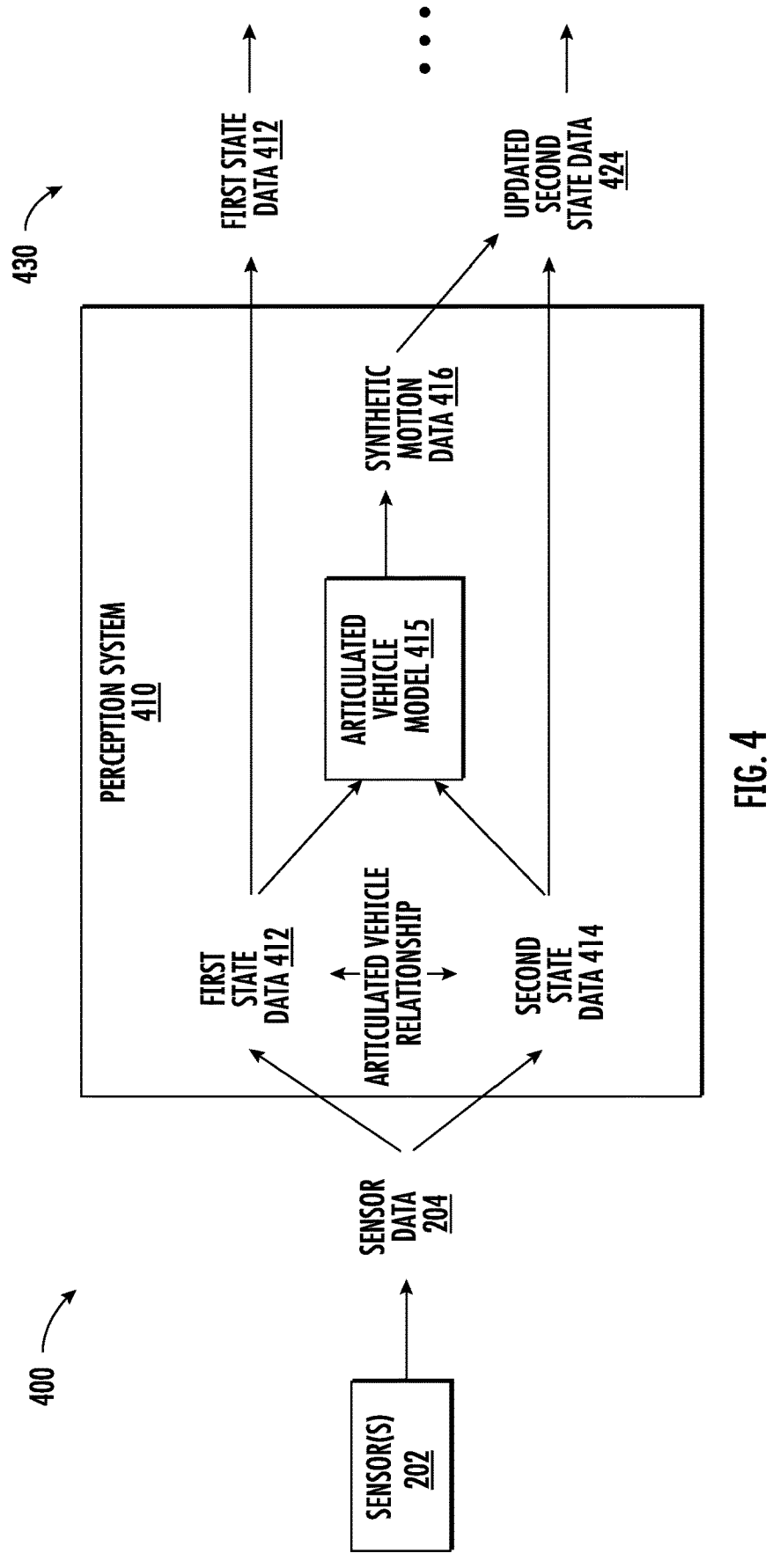
FIG. 4 is a diagram of example autonomy system(s) for an autonomous platform according to some implementations of the present disclosure.

To improve the ability of the autonomy systems (e.g., 200) and its autonomy functions, the technology of the present disclosure provides models for perceiving articulated vehicles and forecasting the motion thereof. FIG. 4 is a diagram of an example autonomy system 400 for an autonomous platform implementing articulated vehicle motion models according to some implementations of the present disclosure. The autonomy system 400 can include one or more sensor(s) 202 configured to generate sensor data 204. The sensor(s) 202 can be configured to capture the sensor data 204 indicating or otherwise being associated with at least a portion of the environment of an autonomous vehicle, as described in further detail with respect to FIG. 2.

The autonomy system 400 can further include a perception system 410. The perception system 410 can be, for example, the perception system 240 of FIG. 2 or other suitable perception system. The perception system 410 can determine one or more states (e.g., current or past state(s), etc.) of one or more objects that are within a surrounding environment of an autonomous platform. In particular, the states can include first state data 412 associated with a first object and second state data 414 associated with a second object. For example, the first state data 412 and the second state data 414 can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 410 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned model. In some implementations, state(s) for one or more identified or unidentified objects can be maintained and updated over time as the autonomous platform continues to perceive or interact with the objects (e.g., maneuver with or around, yield to, etc.). In this manner, the perception system 410 can provide an understanding about a current state of an environment (e.g., including the objects therein, etc.) informed by a record of prior states of the environment (e.g., including movement histories for the objects therein).

According to example aspects of the present disclosure, the perception system 410 can identify an articulated vehicle relationship between the first state data 412 and the second state data 414. For instance, the perception system 410 can recognize that the object represented by the first state data 412 is a first portion of an articulated vehicle and that the object represented by the second state data 414 is a second portion of the articulated vehicle. The perception system 410 can compare state parameters to measure similarity between the state parameters of the first state data 412 and the second state data 414. For instance, the perception system 410 system can identify that the first state data 412 and the second state data 414 share an articulated vehicle relationship if the data shares similar or near-identical velocities, acceleration, etc. or is disposed such that the second portion (e.g., the location described by second state data 414) immediately follows the first portion (e.g., the location described by first state data 412). The articulated vehicle relationship can indicate a predecessor-successor relationship, where a predecessor can be one of the first portion or the second portion of the articulated vehicle and a successor can be the other of the first portion or the second portion of the articulated vehicle. For instance, in some cases, the first portion can be a predecessor of the second portion within the articulated vehicle and the second portion can be a successor of the first portion within the articulated vehicle. Additionally or alternatively, the first portion may be a successor of the second portion and the second portion may be a predecessor of the first portion. It should be understood that, unless otherwise indicated, any two adjacent portions of an articulated vehicle can serve as the first portion or the second portion. For instance, the first portion can be one of a tractor or trailer and the second portion can be the other of the tractor or trailer.

The perception system 410 can generate, using an articulated vehicle motion model 415, synthetic motion data 416 for the second portion based on the first state data 412 for the first portion. For instance, the perception system 410 can provide the first state data 412 or the second state data 414 as inputs to the articulated vehicle model 415. The articulated vehicle motion model 415 can include or define one or more kinematic relationships between one or more parameters of the second portion and one or more parameters of the first portion. The kinematic relationships specified between parameters of the first and second portions can facilitate generating consistent motion data between the first and second portions. For instance, the first state data 412 can populate one or more parameters of the first portion and the kinematic relationships can be used to determine parameters of the second portion based on the first state data 412. Example articulated vehicle motion models 415 are discussed in further detail with respect to FIGS. 5A-5B.

The perception system 410 can update the second state data 414 of the second portion based on the synthetic motion data 416 to produce, as an output of the perception system 410, states 430 including the first state data 412 and updated second state data 424. The synthetic motion data 416 can include synthetic data (e.g., synthetic measurements or observations) for some or all parameters modeled by the second state data 414. The perception system 410 may, for example, overwrite or otherwise update the second state data 414 based on the synthetic motion data 416 to produce the updated second state data 424. The synthetic motion data 416 can also be combined with measured or observed data (e.g., higher-confidence data) for the second portion in the updated second state data 424. Because the synthetic motion data 416 can be created primarily from one portion of the articulated vehicle (e.g., from first state data 412), updating the second state data 414 for the second portion of the articulated vehicle based on the synthetic motion data 416 can produce updated second state data 424 that is consistent with the first state data 412. In addition, updating the second state data 414 in this manner can be relatively computationally inexpensive such that the requisite computations can be performed in near-real-time or be computationally feasible for a motion planning system. The states 430 including the first state data 412 and the updated second state data 424 can be provided to downstream components of an autonomous vehicle control system, such as, for example, a planning system (e.g., planning system 250 of FIG. 2).

Although the example of FIG. 4 is described with respect to an articulated vehicle having two portions, it should be understood that example aspects of the present disclosure contemplate and can be applied to articulated vehicles having any suitable number of portions, such as, for example, three portions, four portions, and so on. For instance, in some implementations, the perception system 410 can produce synthetic measurements for a third portion based on synthetic measurements of a second portion, which are produced based on state data from a first portion. As another example, in some implementations, the articulated vehicle motion model 415 can model relationships between greater than two portions.

Figure 5A:
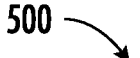
FIGS. 5A-5B are diagrams of example articulated vehicle motion models according to some implementations of the present disclosure.

FIG. 5A is a diagram of an example articulated vehicle motion model 500 according to some implementations of the present disclosure. The example articulated vehicle motion model 500 is depicted from a top-down perspective. The articulated vehicle can include a predecessor 502 and a successor 504. The predecessor 502 and successor 504 can be coupled at hitch 506 (H). As illustrated in the example of FIG. 5A, the predecessor 502 can include a width $W_1$ and a wheelbase $L_1$. The wheelbase $L_1$ can be defined as the distance from the front axle of the predecessor 502 to the rear axle of the predecessor 502. The predecessor 502 can travel at velocity v and can define a wheel angle $\varphi$ at which its front wheels are turned. Additionally, the predecessor 502 can define a predecessor orientation $\theta_1$ at its center axis. The predecessor 502 and successor 504 can be separated by a distance $L_2$, which can be defined as the distance between the rear axle of predecessor 502 and the hitch 506. If the hitch 506 is in front of the rear axle, $L_2$ can be positive. If the hitch 506 is behind the rear axle, as in FIG. 5, $L_2$ can be negative. Additionally, the successor 504 can have a length or wheelbase $L_3$, defined as the distance between the distance between the rear axle and the hitch 506, and a width $W_2$. The successor 504 can define a successor orientation $\theta_2$ at its center axis. A trailer angle $\gamma$ can be defined as the difference the successor orientation $\theta_2$ and the predecessor orientation $\theta_1$. The articulated vehicle motion model 500 can thus model the movement of an articulated vehicle with respect to physical constraints imposed by the coupling between predecessor 502 and successor 504.

Figure 5B:
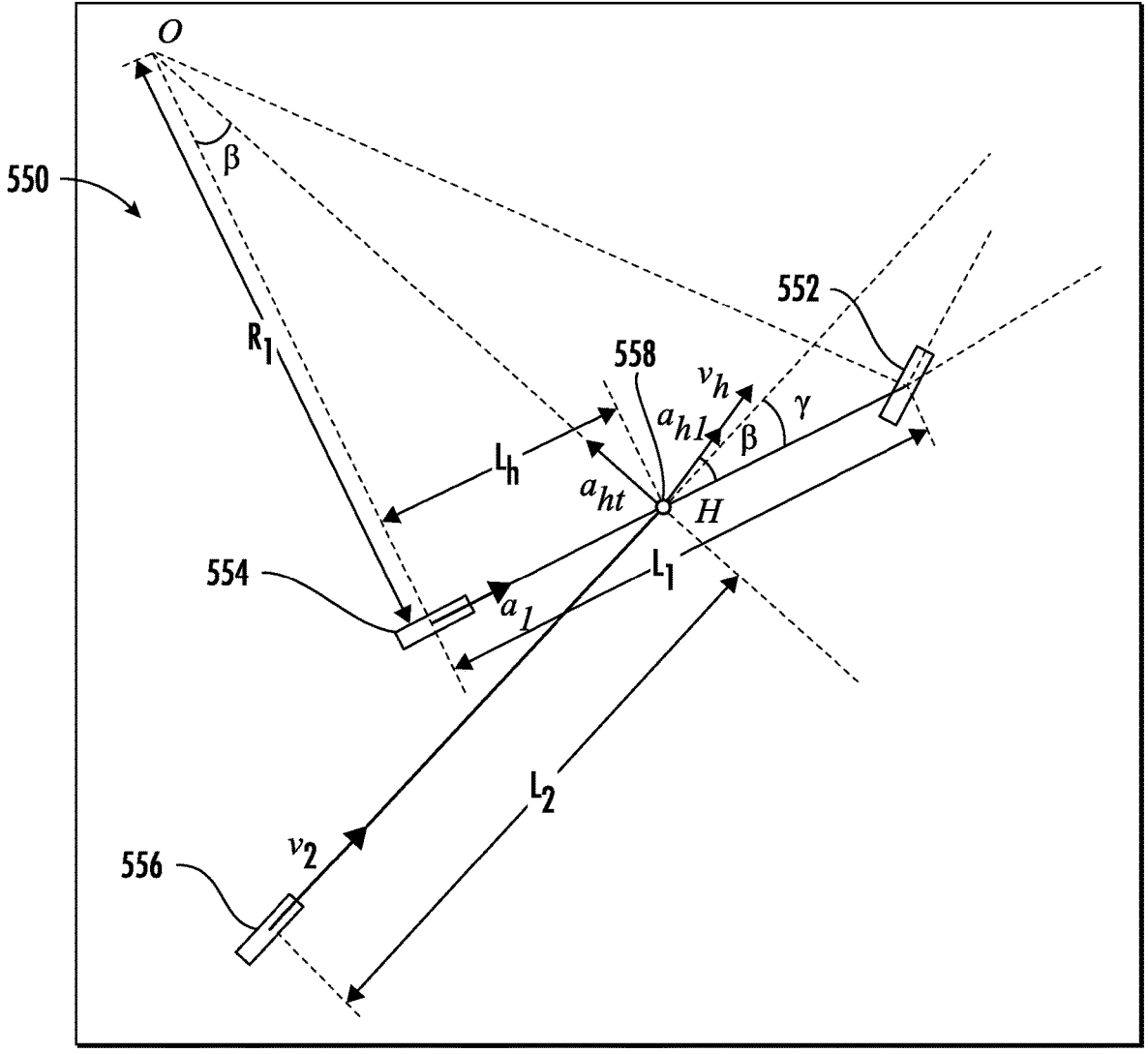

FIG. 5B is a diagram of another example articulated vehicle motion model 550 according to some implementations of the present disclosure. For the purposes of illustration, some variables such as predecessor velocity and orientation are omitted from the illustration of FIG. 5B. One of ordinary skill in the art will be familiar with kinematic components such as orientation and velocity. The model 550 can include a front axle 552 and a rear axle 554 of a predecessor and a rear axle 556 of a successor. The predecessor and successor can be coupled at hitch point 558, also denoted by H in FIG. 5B. The predecessor wheelbase is $L_1$, and the successor wheelbase is $L_2$, which can be defined as the distance from the successor's rear axle 556 to the hitch point 558. The trailer angle $\gamma$ can be defined as the successor orientation minus the predecessor orientation. The distance from the predecessor's rear axle 554 to the hitch point 558 can be represented by $L_h$. In the example depicted in FIG. 5B, the hitch point 558 is in front of the predecessor's real axle 554, so $L_h$ can be positive. If, however, the hitch point 558 were behind the predecessor's rear axle 554, $L_h$ can be negative. The velocity vector at the hitch point 558, can be illustrated as $v_h$, and can have an angle $\beta$ with respect to the predecessor's center line. The successor velocity $v_2$ can be defined as the velocity at the successor axle. The acceleration at the hitch point 558 can be represented by a hitch tangential acceleration $a_{ht}$ and hitch longitude acceleration $a_{hl}$. Finally, $R_1$ can be the turning radius of the predecessor and is equal to the inverse of predecessor curvature.

Using the example articulated vehicle motion models 500, 550 or other suitable articulated vehicle motion models, it can be possible to derive an observation of the state of the successor that is consistent with the kinematics of the predecessor. This derived observation can be the synthetic measurement, which can also be referred to as a "consistent observation" or "pseudo observation" of the successor. For instance, the pseudo observation can be derived from kinematic equations rather than direct sensor measurement and processing of the successor.

For instance, in one example implementation following the articulated vehicle motion model 550 of FIG. 5B, the speed at the hitch point 558 can be determined as the square root of the predecessor velocity squared plus the squared product of predecessor yaw rate, $\omega_1$, and distance between the hitch point and predecessor rear axle, or:

$$v_h = \sqrt{v_1^2 + (\omega_1 L_h)^2}.$$

The predecessor slippage angle at the hitch point can be the arctangent of the product of the predecessor yaw rate and $L_h$ divided by the predecessor velocity, or: $\beta = \arctan(\omega_1 L_h / v_1)$. Since the predecessor yaw rate divided by predecessor velocity can be the predecessor curvature, or $\omega_1 / v_1 = c_1$, the predecessor slippage angle can also be represented by: $\beta = \arctan(c_1 L_h)$.

The successor pivot point (e.g., middle of rear axle) speed can be obtained by projecting $v_h$ to the successor center line. For instance, the successor pivot point speed can be obtained as the hitch point velocity multiplied by the cosine of the difference of the predecessor slippage angle and the trailer angle, or: $v_2 = v_h \cos(\beta - \gamma)$. The difference of the predecessor slippage angle and the trailer angle $(\beta - \gamma)$ can be referred to as the "fifth wheel" angle. The successor yaw rate can be modeled as the product of the hitch point velocity and the sine of the fifth wheel angle, divided by the successor wheelbase, or: $\omega_2 = v_h \sin(\beta - \gamma)$. Furthermore, the curvature at successor pivot point can be the tangent of the fifth wheel angle divided by the successor wheelbase, or: $c_2 = \tan(\beta - \gamma)/L_2$.

Using point O, the instantaneous center of rotation of the predecessor, as the reference point, and/or assuming the predecessor is a rigid body, acceleration at the hitch point 558 can be modeled as $a_h = \dot{\omega}_1 \times \overline{OH} + \omega_1 \times (\omega_1 \times \overline{OH})$, where $\dot{\omega}_1$ is the yaw acceleration vector, $\times$ denotes vector cross product, and $\overline{OH}$ is a vector pointing from O to H, the hitch point 558. The hitch point acceleration $a_h$ has two orthogonal components. The first component $\dot{\omega}_1 \times \overline{OH}$ is denoted as $a_{hl}$ in FIG. 5B. The second component $\omega_1 \times (\omega_1 \times \overline{OH})$ is denoted as $a_{ht}$ in FIG. 5B. Furthermore, since $\omega_1 = v_1 c_1$, it also holds that $\dot{\omega}_1 = a_1 c_1$ through derivation. From FIG. 5B, it can be seen that $$O^-H = R_1/\cos(\beta) = \frac{1}{c_1 \cos(\beta)}.$$

Substituting this value into the equation for predecessor slip angle, an equation for $\overline{OH}$ can be derived as:

$$O^-H = \frac{1}{c_1}\sqrt{c_1^2 L_h^2 + 1}.$$

Furthermore, the magnitude of $a_{hl}$ can be represented as the product of predecessor acceleration and the square root of one plus the product of predecessor curvature squared and $L_h$ squared, or $$a_{hl} = a_1 \sqrt{c_1^2 L_h^2 + 1}.$$

The magnitude of $a_{hl}$ can also be represented as the product of successor acceleration and the square root of one plus the product of successor curvature squared and successor wheelbase squared, or $$a_{hl} = a_2 \sqrt{c_2^2 L_2^2 + 1}.$$

Combining these two equations for the magnitude of $a_{hl}$ yields an equation for successor acceleration at the successor pivot point, which is represented by the product of predecessor acceleration and the quotient of the square root of one plus the product of predecessor curvature squared and $L_h$ squared and the square root of one plus the product of successor curvature squared and successor wheelbase squared, or $$a_2 = a_1 \frac{\sqrt{c_1^2 L_h^2 + 1}}{\sqrt{c_2^2 L_2^2 + 1}}.$$

Thus, using the predecessor state, it can be possible to derive synthetic measurements, or pseudo observations, on the successor's speed, curvature, and acceleration using the equations illustrated above for the articulated vehicle motion model 550 of FIG. 5B. Because these observations do not include $L_1$ and are not sensitive to noise in $L_h$ and $L_2$, they can be beneficially robust to inaccuracies in these parameters.

Similarly, given the predecessor wheelbase and trailer angle, systems and methods can derive the observation of the predecessor that is consistent with the successor kinematics (e.g., if observations from the successor are available). The speed at the hitch point can be determined as the square root of the successor velocity squared plus the squared product of successor yaw rate and successor wheelbase, or $$v_h = \sqrt{v_2^2 + (\omega_2 L_2)^2}.$$

The successor slippage angle (or the fifth wheel angle) at the hitch point can be defined as the arctangent of the product of successor yaw rate and successor wheelbase divided by successor velocity, or $\alpha = \arctan(\omega_2 L_2 / v_2)$, or, equivalently, $\alpha = \arctan(c_2 L_2)$.

The predecessor pivot point (middle of rear axle) speed can be the product of hitch point velocity and the cosine of the sum of successor slippage angle and fifth wheel angle, or $v_1 = v_h \cos(\alpha + \gamma)$. Furthermore, the predecessor yaw rate can be the product of hitch point velocity and the sine of the sum of successor slippage angle and fifth wheel angle, divided by $L_h$, or $\omega_1 = v_h \sin(\alpha + \gamma)/L_h$. The curvature at predecessor pivot point $c_1$ can be the tangent of the sum of the successor slippage angle and fifth wheel angle, divided by $L_h$, or $c_1 = \tan(\alpha + \gamma)/L_h$.

Finally, the acceleration of the predecessor can be represented by the product of successor acceleration and the quotient of the square root of one plus the product of successor curvature squared and successor wheelbase squared and the square root of one plus the product of predecessor curvature squared and $L_h$ squared, or $$a_1 = a_2 \frac{\sqrt{c_2^2 L_2^2 + 1}}{\sqrt{c_1^2 L_h^2 + 1}},$$

following a similar derivation to the successor acceleration equation given above.

Thus, using the successor state, it can be possible to derive synthetic measurements, or pseudo observations, of the predecessor's speed, curvature, and acceleration using the equations illustrated above for the articulated vehicle motion model 550 of FIG. 5B. The pseudo observation of predecessor speed can be relatively accurate, since both $v_h$ and $\alpha$ can generally be accurately computed.

Figure 6A:
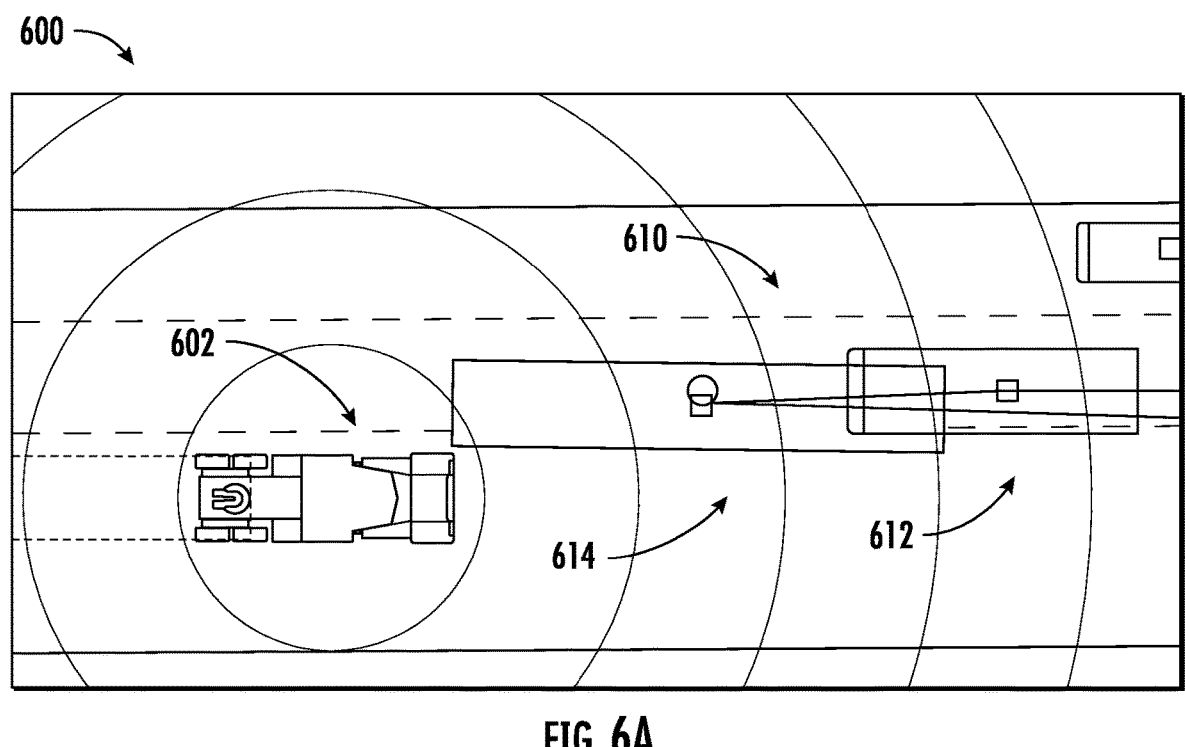
FIGS. 6A-6B are example scenarios of articulated vehicle tracking according to some implementations of the present disclosure.

FIG. 6A is an example scenario 600 of articulated vehicle tracking according to some implementations of the present disclosure. In particular, an autonomous vehicle 602 can track an articulated vehicle 610 including a predecessor 612 and a successor 614. As illustrated in FIG. 6A, the articulated vehicle 610 is a semitruck, where the predecessor 612 is a tractor and the successor 614 is a trailer. It should be understood that the articulated vehicle 610 can be any suitable articulated vehicle, such as a multi-trailer truck, an articulated bus, a car or pickup truck towing a trailer, or any other suitable articulated vehicle.

The autonomous vehicle 602 can estimate a state of articulated vehicle 610, and in particular estimate a state of predecessor 612 and successor 614. In systems utilizing the technology according to example aspects of the present disclosure, states of predecessor 612 and successor 614 can be desirably consistent such that the states reflect the physical reality that predecessor 612 and successor 614 are coupled. However, due to occlusion of sensors, perspective limitations, and other factors, the states of predecessor 612 and successor 614, if determined without dynamic constraints, can be inconsistent. For example, in the example illustrated in FIG. 6A, that the orientation/yaw rate of predecessor 612 is slightly offset from the orientation/yaw rate of successor 614 as perceived by the autonomous vehicle 602, likely due to factors such as limited observation capabilities. For instance, the scenario 600 depicts an example where the autonomous vehicle may be positioned too close to the articulated vehicle 610 to fully observe the articulated vehicle 610, leading to inaccurate predictions. However, by estimating pseudo observations in accordance with the present disclosure, the autonomous vehicle 602 can better reason about its environment including the orientation/yaw rates of articulated vehicle 610.

Figure 6B:
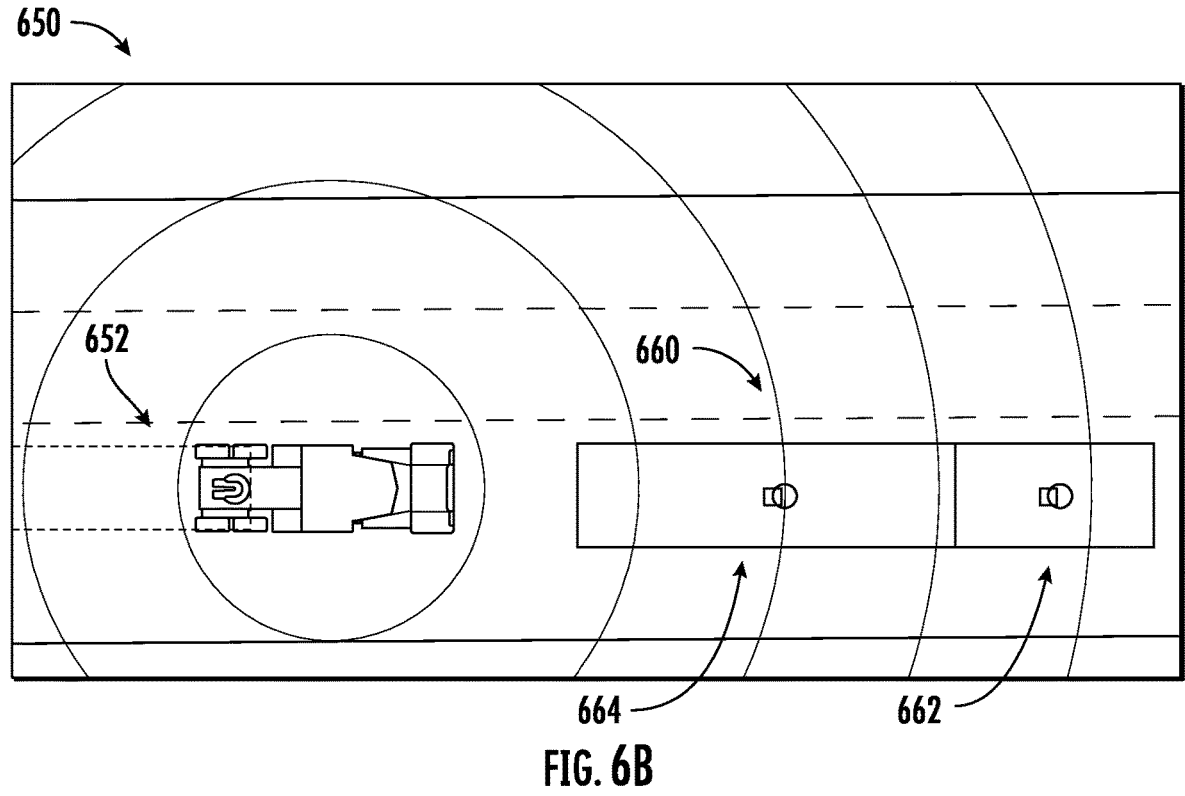

FIG. 6B is another example scenario 650 of articulated vehicle tracking according to some implementations of the present disclosure. In particular, an autonomous vehicle 652 can track an articulated vehicle 660 including a predecessor 662 and a successor 664. As illustrated in FIG. 6B, the autonomous vehicle 652 is positioned closely behind the articulated vehicle 660 such that the predecessor 662 is substantially obscured by the successor 664. In this scenario, it can be difficult for the autonomous vehicle 652 to observe and subsequently reason about the predecessor 662. For instance, the autonomous vehicle 652 can estimate different forward velocities for the predecessor 662 and the successor 664.

FIG. 7 is a flowchart of a method 700 according to some implementations of the present disclosure. One or more portions of the method 700 can be implemented by one or more devices (e.g., one or more computing devices) or systems including, for example, the computing system 180 shown in FIG. 1, the autonomy system(s) 200 shown in FIG. 2, the computing ecosystem 10 of FIG. 8, or any other suitable systems or devices. Moreover, one or more portions of the method 700 can be implemented as an algorithm on the hardware components of the devices described herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

The method 700 includes, at 702, obtaining, through one or more sensor systems onboard a vehicle (e.g., an autonomous vehicle, autonomous platform, etc.), sensor data descriptive of an environment of the vehicle. The sensor system(s) can be configured to capture the sensor data indicating or otherwise being associated with at least a portion of the environment of the vehicle. The sensor data can include image data (e.g., 2D camera data, video data, etc.), RADAR data, LIDAR data (e.g., 3D point cloud data, etc.), audio data, or other types of data. In some implementations, the autonomy system can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system can obtain sensor data associated with particular component(s) or system(s) of an autonomous platform. This sensor data can indicate, for example, wheel speed, component temperatures, steering angle, cargo or passenger status, etc. In some implementations, the autonomy system can obtain sensor data associated with ambient conditions, such as environmental or weather conditions. In some implementations, the sensor data can include multi-modal sensor data. The multi-modal sensor data can be obtained by at least two different types of sensor(s) (e.g., of the sensors) and can indicate static object(s) or actor(s) within an environment of the autonomous platform. The multi-modal sensor data can include at least two types of sensor data (e.g., camera and LIDAR data). In some implementations, the autonomous platform can utilize the sensor data for sensors that are remote from (e.g., offboard) the autonomous platform. This can include for example, sensor data captured by a different autonomous platform.

The environment can include an articulated vehicle having at least a first portion and a second portion. The first portion and the second portion can be connected at a joint of the articulated vehicle. For instance, in some implementations, the articulated vehicle can be a vehicle that has a permanent or semi-permanent pivot joint in its construction (e.g., a hitch point), allowing it to turn more sharply than a vehicle of similar or same length lacking the joint. The joint can be permanent such that the first portion and the second portion may not be disconnected without damage to the articulated vehicle or semi-permanent such that the first portion and the second portion can be coupled or decoupled during normal operation of the articulated vehicle (e.g., by operating a coupling mechanism). Because of the connection at the joint, each portion of the articulated vehicle generally cannot move fully independently. For example, if a predecessor is traveling at 30 meters per second in a direction, the successor must also travel at 30 meters per second in that direction. As another example, if a predecessor is traveling at a first orientation, the successor will generally travel at the first orientation. Example aspects of the present disclosure are discussed herein with respect to a first portion and a second portion, but it should be understood that articulated vehicles can have greater than two portions, such as three portions, four portions, and so on. For instance, with the exception of the end portions, each portion can simultaneously act as a first portion and a second portion according to example aspects of the present disclosure.

According to example aspects of the present disclosure, an articulated vehicle can be or can include any suitable vehicle having greater than one portion. Examples of articulated vehicles include semitrucks pulling one or more trailers, segmented or articulated buses, cars or automobiles pulling one or more trailers, construction equipment, or any other suitable articulated vehicle.

In one example implementation, the articulated vehicle is a truck including a tractor and a trailer. The first portion can be one of the tractor or the trailer, and the second portion can be the other of the tractor or the trailer. For instance, example aspects of the present disclosure can be applied reciprocally to any portion of an articulated vehicle.

As another example, in some implementations, the first portion is a first trailer and the second portion is a second trailer. A third portion can be a cab or tractor of a truck pulling the first trailer and the second trailer. In yet another example, the first portion can be a first segment of a segmented bus (e.g., an engine segment) and the second portion can be a second segment of a segmented bus (e.g., a trailing segment).

The method 700 includes, at 704, generating, based on the sensor data, first state data for the first portion of the articulated vehicle and second state data for the second portion of the articulated vehicle. For instance, the first state data or the second state data can be generated by a tracking system (e.g., a perception system). The tracking system can establish an initial state of objects (e.g., actors) in the environment. The tracking system can receive as input sensor data including measurements or detections, such as RADAR detections, camera detections, LIDAR detections, and so on. The tracking system can generate state data descriptive of an actor at a point in time. The state data can be or can include a multidimensional vector or tensor, such as a vector defining position, speed, acceleration, or other kinematics in given coordinate directions. As another example, the state data can be or can include a covariance matrix, tensor, etc. descriptive of how accurate the state data is (e.g., how confident the tracking system is in its output).

In particular, in some implementations, the first state data and the second state data can be generated without respect to any extant articulated vehicle relationship between the first portion and the second portion. For instance, the first state data and the second state data can model the first portion and the second portion independently. Due to minor inaccuracies such as noise, bias, etc. in the tracking system, the first state data and the second state data can present minor inconsistencies such as differing velocities for the first portion and the second portion in a given direction, when in reality the first portion and the second portion are moving together.

The method 700 includes, at 706, determining an articulated vehicle relationship between the first portion and the second portion based on the first state data for the first portion and the second state data for the second portion. For instance, the autonomous vehicle control system can analyze the outputs of the tracking system to identify state data that represents distinct portions of an articulated vehicle. For example, the AV control system can realize that the first state data and the second state data each correspond to different parts of the same articulated vehicle. The AV control system can identify state data corresponding to distinct portions of an articulated vehicle by comparing state parameters to measure similarity between the state parameters of the first state data and the second state data. For instance, the AV control system can identify state data as having an articulated vehicle relationship if the state data shares near-identical velocities, acceleration, etc. or is disposed such that the second portion immediately follows the first portion. The articulated vehicle relationship can indicate a predecessor-successor relationship, where a predecessor can be one of the first portion or the second portion of the articulated vehicle and a successor can be the other of the first portion or the second portion of the articulated vehicle. For instance, in some cases, the first portion can be a predecessor of the second portion within the articulated vehicle and the second portion can be a successor of the first portion within the articulated vehicle. Additionally or alternatively, the first portion may be a successor of the second portion and the second portion may be a predecessor of the first portion. It should be understood that, unless otherwise indicated, any two adjacent portions of an articulated vehicle can serve as the first portion or the second portion. For instance, the first portion can be one of a tractor or trailer and the second portion can be the other of the tractor or trailer.

The method 700 includes, at 708, generating, using an articulated vehicle motion model, synthetic motion data for the second portion based on the first state data for the first portion. The method 700 includes, at 710, updating the second state data of the second portion based on the synthetic motion data. For instance, the synthetic motion data can include synthetic data (e.g., synthetic measurements or observations) for some or all parameters modeled by the second state data. The AV control system may, for example, overwrite or otherwise update the second state data based on the synthetic motion data. Because the synthetic motion data is created primarily from one portion of the articulated vehicle, updating the state data for the second portion of the articulated vehicle based on the synthetic motion data can produce second state data that is consistent with the first state data. In addition, updating the second state data in this manner can be relatively computationally inexpensive such that the requisite computations can be performed in near-real-time or be computationally feasible for a motion planning system.

The articulated vehicle motion model can include or define one or more kinematic relationships between one or more parameters of the second portion and one or more parameters of the first portion. For instance, the parameters of the first portion can include at least one of: a position of a wheelbase of the first portion, an orientation of the first portion, or a position of a joint of the articulated vehicle relative to the first portion. Furthermore, in some implementations, the one or more kinematic relationships can be based on an acceleration and a velocity of a joint of the articulated vehicle. The kinematic relationships specified between parameters of the first and second portions can facilitate generating consistent motion data between the first and second portions. Example articulated vehicle motion models are discussed in further detail with respect to FIGS. 5A-5B.

The articulated vehicle motion model can be or can include a kinematic model or a dynamic model. For instance, the articulated vehicle motion model can be a kinematic model including one or more kinematic equations describing one or more kinematic relationships between bodies of an articulated vehicle. Additionally or alternatively, the articulated vehicle motion model can be a dynamic model including one or more dynamic equations describing one or more dynamic relationships between bodies of an articulated vehicle (e.g., with respect to forces acting on the articulated vehicle).

For instance, in one example implementations, determining the one or more parameters of the second portion (a successor) based on the one or more parameters of the first portion (a predecessor) can include: (i) determining a velocity at a hitch point as the square root of a predecessor velocity squared plus the squared product of predecessor yaw rate and distance between the hitch point and predecessor rear axle; (ii) determining a predecessor slippage angle as the arctangent of the product of the predecessor yaw rate and the distance between the hitch point and predecessor rear axle divided by the predecessor velocity; (iii) determining a successor velocity as hitch point velocity multiplied by the cosine of the difference of the predecessor slippage angle and a trailer angle defined as the difference between the successor orientation predecessor orientation; (iv) determining a successor yaw rate as product of the hitch point velocity and the sine of the fifth wheel angle (e.g., the difference between the predecessor slippage angle and the trailer angle), divided by the successor wheelbase; (v) determining a successor curvature tangent of the fifth wheel angle divided by the successor wheelbase; and (vi) determining a successor acceleration by projecting acceleration components at the hitch point onto a successor center line.

In another example implementation, determining the one or more parameters of the second portion (a predecessor) based on the one or more parameters of the second portion (a successor) can include: (i) determining a velocity at the hitch point as the square root of the successor velocity squared plus the squared product of successor yaw rate and successor wheelbase; (ii) determining a successor slippage angle or fifth wheel angle at the hitch point as the arctangent of the product of successor yaw rate and successor wheelbase divided by successor velocity; (iii) determining a predecessor velocity as the product of hitch point velocity and the cosine of the sum of the successor slippage angle and the fifth wheel angle; (iv) determining a predecessor yaw rate as the product of hitch point velocity and the sine of the sum of successor slippage angle and fifth wheel angle, divided by the distance between the hitch point and the predecessor rear axle; (v) determining the predecessor curvature as the tangent of the sum of the successor slippage angle and fifth wheel angle, divided by the distance between the hitch point and the predecessor rear axle; and (vi) determining the predecessor acceleration by projecting acceleration components at the hitch point onto a predecessor center line.

The synthetic motion data may not necessarily be complete state data. Although in some implementations the synthetic motion data can include data for each parameter modeled by the state data, in some other implementations, the synthetic motion data can include only data for a subset of parameters modeled by the state data. The subset of parameters can be parameters of relatively higher importance in motion planning for the vehicle. As an example, if it is only beneficial to make speed consistent across multiple portions, such as for computational efficiency in certain scenarios such as following patterns, braking patterns, etc., the synthetic motion data can include only velocity parameters (or acceleration parameters, etc.). In particular, this approach may be helpful in cases where precision in determining speed of travel of articulated vehicles is prioritized over precision in determining direction of travel of an articulated vehicle, such as in cases where a portion of an articulated vehicle in front of the autonomous platform is obscured.

In some implementations, generating the synthetic motion data includes determining whether to model the synthetic motion data for the second portion based on at least one of: (i) a confidence associated with the sensor data, or (ii) a confidence associated with the first state data or the second state data. The confidence(s) associated with data can be produced by the systems generating the data to represent a degree of certainty or surety associated with that data. The confidence(s) can be represented as a confidence score, such as a numerical value ranging from a low extrema to a high extrema. As an example, the sensor system(s) may output a confidence score associated with the sensor data that reflects a degree of expected accuracy with respect to measurements in the sensor data.

In some cases, the independently-tracked state data for each portion can be sufficient for many navigation tasks. For instance, in some implementations, the synthetic motion data can only be generated in the event of low confidence in some measurement or prediction relating to the articulated vehicle. The synthetic motion data can only be generated in cases of low confidence, such as when sensor data corresponding to one portion of the articulated vehicle has low confidence or low sensor visibility. The synthetic motion data can thus be determined from the portion having higher confidence and applied to the portion having lower confidence to produce second state data that is consistent with the higher-confidence first state data.

In some implementations, the method 700 optionally includes, at 712, determining a motion trajectory for the vehicle based on the first state data and the second state data. For instance, the first state data and the second state data can describe an articulated vehicle in the environment of the autonomous vehicle. The motion trajectories can indicate a path for an autonomous vehicle to follow that navigates the autonomous vehicle through the environment including the articulated vehicle described by the first state data and the second state data, or other actors or objects in the environment. A trajectory can be of a certain length or time range. The length or time range can be defined by the computational planning horizon of a planning system. A motion trajectory can be defined by one or more waypoints (with associated coordinates) and can include velocity or acceleration parameters. The waypoint(s) can be future location(s) for the autonomous platform. The motion trajectory can include waypoints, velocities, accelerations, etc. that navigate the vehicle in a manner that does not interfere with the articulated vehicle (e.g., maintains a safe distance), or vice versa.

In some implementations, the method 700 optionally includes, at 714, controlling the vehicle based on the motion trajectory. The control system of the vehicle can, for example, translate a motion trajectory into instructions for the appropriate vehicle control devices (e.g., acceleration control, brake control, steering control, etc.). By way of example, the control system can translate a selected motion trajectory into instructions to adjust a steering component (e.g., a steering angle) by a certain number of degrees, apply a certain magnitude of braking force, increase/decrease speed, etc. as described herein. In this way, the control system can implement the motion trajectory such that the autonomous motion of the autonomous vehicle accounts for the presence of the articulated vehicle and its tracked and forecasted motion.

FIG. 8 is a block diagram of an example computing ecosystem 10 according to some implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.).

In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data (e.g., RADAR data), map data, data associated with autonomy functions (e.g., data associated with the perception, planning, or control functions), simulation data, or any data or information described herein. As one example, the data 24 can include state data associated with articulated vehicles that is determined according to example aspects of the present disclosure.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein.

In some implementations, the first computing system 20 can store or include one or more models 26. The one or more models 26 can be or can include mathematical models, rules (e.g., manually-designed rules), mathematical equations, and other structures defining relationships between one or more parameters or one or more inputs/outputs. For instance, the models 26 can be or can include one or more articulated vehicle motion models, such as the articulated vehicle motion models 500 and 550 of FIGS. 5A-5B or another suitable articulated vehicle motion model. The articulated vehicle motion models can include or define one or more kinematic relationships between one or more parameters of a first portion of an articulated vehicle and one or more parameters of a second portion of an articulated vehicle. For instance, the parameters of the first portion can include at least one of: a position of a wheelbase of the first portion, an orientation of the first portion, or a position of a joint of the articulated vehicle relative to the first portion. Furthermore, in some implementations, the one or more kinematic relationships can be based on an acceleration and a velocity of a joint of the articulated vehicle. The kinematic relationships specified between parameters of the first and second portions can facilitate generating consistent motion data between the first and second portions.

In some implementations, the models 26 can be or can otherwise include one or more machine-learned models. As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. As one example, the data 44 can include state data associated with articulated vehicles that is determined according to example aspects of the present disclosure. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.).

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

In addition, or alternatively to, the model(s) 26 at the first computing system 20, the second computing system 40 can include one or more models 46. The one or more models 46 can be or can include mathematical models, rules (e.g., manually-designed rules), mathematical equations, and other structures defining relationships between one or more parameters or one or more inputs/outputs. For instance, the models 46 can be or can include one or more articulated vehicle motion models, such as the articulated vehicle motion models 500 and 550 of FIGS. 5A-5B or another suitable articulated vehicle motion model. The articulated vehicle motion models can include or define one or more kinematic relationships between one or more parameters of a first portion of an articulated vehicle and one or more parameters of a second portion of an articulated vehicle. For instance, the parameters of the first portion can include at least one of: a position of a wheelbase of the first portion, an orientation of the first portion, or a position of a joint of the articulated vehicle relative to the first portion. Furthermore, in some implementations, the one or more kinematic relationships can be based on an acceleration and a velocity of a joint of the articulated vehicle. The kinematic relationships specified between parameters of the first and second portions can facilitate generating consistent motion data between the first and second portions.

Additionally or alternatively, the model(s) 46 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 8 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. In addition, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method, comprising:
(a) obtaining, through one or more sensor systems onboard a vehicle, sensor data descriptive of an environment of the vehicle, the environment comprising an articulated vehicle having at least a first portion and a second portion;
(b) generating, based on the sensor data, first state data for the first portion of the articulated vehicle and second state data for the second portion of the articulated vehicle;
(c) determining an articulated vehicle relationship indicating a predecessor-successor relationship between the first portion and the second portion, where a predecessor comprises one of the first portion or the second portion and a successor comprises the other of the first portion or the second portion,
wherein determining the articulated vehicle relationship is based on;
a comparison between a first acceleration and a first velocity of the first state data for the first portion and a second acceleration and a second velocity of the second state data for the second portion; and determining that a successor position of the successor follows a predecessor position of the predecessor,
(d) generating, using an articulated vehicle motion model indicative of one or more kinematic relationships between the first portion and the second portion, synthetic motion data for the second portion based on the first state data for the first portion, the synthetic motion data indicative of one or more synthetic observations consistent with the first state data;
(e) updating the second state data of the second portion based on the synthetic motion data;
(f) determining a motion trajectory for the vehicle based on the first state data and the second state data; and
(g) controlling the vehicle based on the motion trajectory.

2. The computer-implemented method of claim 1, wherein the articulated vehicle relationship indicates a predecessor-successor relationship, wherein a predecessor comprises one of the first portion or the second portion of the articulated vehicle and a successor comprises the other of the first portion or the second portion of the articulated vehicle.

3. The computer-implemented method of claim 1, wherein the first portion and the second portion are connected at a joint of the articulated vehicle.

4. The computer-implemented method of claim 1, wherein the articulated vehicle is a truck comprising a tractor and a trailer, wherein the first portion comprises one of the tractor or the trailer, and wherein the second portion comprises the other of the tractor or the trailer.

5. The computer-implemented method of claim 1, wherein the first portion is a first trailer and the second portion is a second trailer.

6. The computer-implemented method of claim 1, wherein the articulated vehicle motion model comprises one or more kinematic relationships between one or more parameters of the second portion and one or more parameters of the first portion.

7. The computer-implemented method of claim 6, wherein the parameters of the first portion comprise at least one of: a position of a wheelbase of the first portion, an orientation of the first portion, or a position of a joint of the articulated vehicle relative to the first portion.

8. The computer-implemented method of claim 6, wherein the one or more kinematic relationships are based on an acceleration and a velocity of a joint of the articulated vehicle.

9. The computer-implemented method of claim 6, further comprising populating the one or more parameters of the second portion based on the one or more parameters of the first portion to comprise consistent motion data between the first portion and the second portion.

10. The computer-implemented method of claim 1, wherein (d) comprises determining whether to model the synthetic motion data for the second portion based on at least one of: (i) a confidence associated with the sensor data, or (ii) a confidence associated with the first state data or the second state data.

11. The computer-implemented method of claim 1, further comprising overwriting one or more parameters of the second state data based on the one or more synthetic observations.

12. An autonomous vehicle control system, comprising:
one or more processors; and
one or more non-transitory, computer-readable media storing instructions that cause the one or more processors to perform operations comprising:

(a) obtaining, through one or more sensor systems onboard a vehicle, sensor data descriptive of an environment of the vehicle, the environment comprising an articulated vehicle having at least a first portion and a second portion;

(b) generating, based on the sensor data, first state data for the first portion of the articulated vehicle and second state data for the second portion of the articulated vehicle;

(c) determining an articulated vehicle relationship indicating a predecessor-successor relationship between the first portion and the second portion, where a predecessor comprises one of the first portion or the second portion and a successor comprises the other of the first portion or the second portion, wherein determining the articulated vehicle relationship is based on;

a comparison between a first acceleration and a first velocity of the first state data for the first portion and a second acceleration and a second velocity of the second state data for the second portion; and determining that a successor position of the successor follows a predecessor position of the predecessor;

(d) generating, using an articulated vehicle motion model indicative of one or more kinematic relationships between the first portion and the second portion, synthetic motion data for the second portion based on the first state data for the first portion, the synthetic motion data indicative of one or more synthetic observations consistent with the first state data;

(e) updating the second state data of the second portion based on the synthetic motion data;

(f) determining a motion trajectory for the vehicle based on the first state data and the second state data; and (g) controlling the vehicle based on the motion trajectory.

13. The autonomous vehicle control system of claim 12, wherein the articulated vehicle relationship indicates a predecessor-successor relationship, wherein a predecessor comprises one of the first portion or the second portion of the articulated vehicle and a successor comprises the other of the first portion or the second portion of the articulated vehicle.

14. The autonomous vehicle control system of claim 12, wherein the first portion and the second portion are connected at a joint of the articulated vehicle.

15. The autonomous vehicle control system of claim 12, wherein the articulated vehicle is a truck comprising a tractor and a trailer, wherein the first portion comprises one of the tractor or the trailer, and wherein the second portion comprises the other of the tractor or the trailer.

16. The autonomous vehicle control system of claim 12, wherein the articulated vehicle motion model comprises one or more kinematic relationships between one or more parameters of the second portion and one or more parameters of the first portion.

17. The autonomous vehicle control system of claim 16, wherein the parameters of the first portion comprise at least one of: a position of a wheelbase of the first portion, an orientation of the first portion, or a position of a joint of the articulated vehicle relative to the first portion.

18. The autonomous vehicle control system of claim 16, wherein the one or more kinematic relationships are based on an acceleration and a velocity of a joint of the articulated vehicle.

19. The autonomous vehicle control system of claim 12, wherein (d) comprises determining whether to model the synthetic motion data for the second portion based on at least one of: (i) a confidence associated with the sensor data, or (ii) a confidence associated with the first state data or the second state data.

20. An autonomous vehicle, comprising:

one or more processors; and one or more non-transitory, computer-readable media storing instructions that cause the one or more processors to perform operations comprising:

(a) obtaining, through one or more sensor systems onboard a vehicle, sensor data descriptive of an environment of the vehicle, the environment comprising an articulated vehicle having at least a first portion and a second portion;

(b) generating, based on the sensor data, first state data for the first portion of the articulated vehicle and second state data for the second portion of the articulated vehicle;

(c) determining an articulated vehicle relationship indicating a predecessor-successor relationship between the first portion and the second portion, where a predecessor comprises one of the first portion or the second portion and a successor comprises the other of the first portion or the second portion, wherein determining the articulated vehicle relationship is based on;

a comparison between a first acceleration and a first velocity of the first state data for the first portion and a second acceleration and a second velocity of the second state data for the second portion; and determining that a successor position of the successor follows a predecessor position of the predecessor, (d) generating, using an articulated vehicle motion model indicative of one or more kinematic relationships between the first portion and the second portion, synthetic motion data for the second portion based on the first state data for the first portion, the synthetic motion data indicative of one or more synthetic observations consistent with the first state data;

(e) updating the second state data of the second portion based on the synthetic motion data;

(f) determining a motion trajectory for the vehicle based on the first state data and the second state data; and (g) controlling the vehicle based on the motion trajectory.

* * * * *